(12) United States Patent
Uemura

(10) Patent No.: US 12,459,299 B2
(45) Date of Patent: Nov. 4, 2025

(54) PNEUMATIC TIRE

(71) Applicant: The Yokohama Rubber Co., LTD., Tokyo (JP)

(72) Inventor: Takanori Uemura, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 498 days.

(21) Appl. No.: 17/293,357

(22) PCT Filed: Nov. 12, 2019

(86) PCT No.: PCT/JP2019/044404
§ 371 (c)(1),
(2) Date: May 12, 2021

(87) PCT Pub. No.: WO2020/105513
PCT Pub. Date: May 28, 2020

(65) Prior Publication Data
US 2022/0009290 A1 Jan. 13, 2022

(30) Foreign Application Priority Data
Nov. 21, 2018 (JP) ................................ 2018-218167

(51) Int. Cl.
*B60C 11/12* (2006.01)
*B60C 11/00* (2006.01)
*B60C 11/03* (2006.01)

(52) U.S. Cl.
CPC .......... *B60C 11/0083* (2013.01); *B60C 11/12* (2013.01); *B60C 2011/0339* (2013.01); *B60C 2011/0386* (2013.01)

(58) Field of Classification Search
CPC ......... B60C 11/0083; B60C 2011/0033; B60C 11/0008; B60C 11/00
See application file for complete search history.

(56) References Cited

U.S. PATENT DOCUMENTS

| | | | |
|---|---|---|---|
| 4,387,754 A * | 6/1983 | Mirtain | B60C 11/04 152/209.1 |
| 2017/0028792 A1* | 2/2017 | Yumii | B60C 5/00 |

(Continued)

FOREIGN PATENT DOCUMENTS

| | | |
|---|---|---|
| CN | 107031298 A | 8/2017 |
| EP | 3159186 A1 | 4/2017 |

(Continued)

*Primary Examiner* — Cedrick S Williams
(74) *Attorney, Agent, or Firm* — Thorpe North & Western

(57) ABSTRACT

Provided is a pneumatic tire. A chamfered portion and a non-chamfered portion are provided in each of an edge on a leading side and an edge on a trailing side of a sipe. In a meridian cross-sectional view, a profile line of a rib projects further to an outer side in a tire radial direction than a reference tread profile line. A radius of curvature TR of the reference tread profile line and a radius of curvature RR of the profile line satisfy TR>RR. Only one of the chamfered portions on the leading side and the trailing side is disposed so as to straddle a maximum projection position. A maximum projection amount D of the rib with respect to the reference tread profile line and a maximum width W of the chamfered portion satisfy $0.05 \text{ mm}^2 < W \times D < 1.50 \text{ mm}^2$.

10 Claims, 6 Drawing Sheets

(56) References Cited

U.S. PATENT DOCUMENTS

| | | | | |
|---|---|---|---|---|
| 2017/0297377 A1* | 10/2017 | Honda | ................ | B60C 11/0304 |
| 2019/0152272 A1* | 5/2019 | Kouda | ................ | B60C 11/0304 |
| 2021/0188013 A1* | 6/2021 | Morito | ................ | B60C 11/1259 |

FOREIGN PATENT DOCUMENTS

| | | | | | |
|---|---|---|---|---|---|
| JP | 2005138678 A | * | 6/2005 | | |
| JP | 2013-537134 A | | 9/2013 | | |
| JP | 2016-74391 A | | 5/2016 | | |
| WO | 2014/129647 A1 | | 8/2014 | | |
| WO | 2017/141912 A1 | | 8/2017 | | |
| WO | 2017/141913 A1 | | 8/2017 | | |
| WO | WO-2017159712 A1 | * | 9/2017 | ............. | B60C 11/03 |

\* cited by examiner

PNEUMATIC TIRE

TECHNICAL FIELD

The present technology relates to a pneumatic tire and particularly relates to a pneumatic tire that can provide improved steering stability performance on dry road surfaces and improved steering stability performance on wet road surfaces in a compatible manner by devising a sipe chamfer shape.

BACKGROUND ART

In the related art, in a tread pattern of a pneumatic tire, a plurality of sipes are formed in a rib defined by a plurality of main grooves. By providing such sipes, drainage properties are ensured, and steering stability performance on wet road surfaces is exhibited. However, when a large number of sipes are disposed in a tread portion in order to improve the steering stability performance on wet road surfaces, the rigidity of the ribs decreases, which has the disadvantage that steering stability performance on dry road surfaces deteriorates.

Various pneumatic tires have been proposed in which sipes are formed in a tread pattern and chamfered (for example, see Japan Unexamined Patent Publication No. 2013-537134). If the sipes are formed and chamfered, edge effects may be lost depending on the shape of the chamfers, and depending on the dimensions of the chamfers, improvement in steering stability performance on dry road surfaces and improvement in steering stability performance on wet road surfaces may be insufficient.

SUMMARY

The present technology provides a pneumatic tire that can provide improved steering stability performance on dry road surfaces and improved steering stability performance on wet road surfaces in a compatible manner by devising a sipe chamfer shape.

A pneumatic tire according to an embodiment of the present technology includes: in a tread portion, a plurality of main grooves extending in a tire circumferential direction, a plurality of rows of ribs defined by the plurality of main grooves, and a sipe extending in a tire width direction, the sipe including at least one end communicating with the main groove and an edge on a leading side and an edge on a trailing side, the edges facing each other, a chamfered portion shorter than a sipe length of the sipe being formed in each of the edge on the leading side and the edge on the trailing side, a non-chamfered region where other chamfered portions are not present being provided in a portion of the sipe facing each of the chamfered portions, a profile line defining a road contact surface of the rib including the sipe projecting further to an outer side in a tire radial direction than a reference tread profile line in a meridian cross-sectional view, a radius of curvature TR (mm) of an arc forming the reference tread profile line and a radius of curvature RR (mm) of an arc forming the profile line of the rib satisfying a relationship of TR>RR, only one of the chamfered portions on the leading side and the trailing side of the sipe being disposed so as to straddle a maximum projection position of the profile line of the rib, and a maximum projection amount D (mm) of the rib with respect to the reference tread profile line and a maximum width W (mm) of the chamfered portion disposed so as to straddle the maximum projection position satisfying a relationship of $0.05 \text{ mm}^2 < W \times D < 1.50 \text{ mm}^2$.

In an embodiment of the present technology, the pneumatic tire includes sipes that extend in the tire width direction in ribs defined by the main grooves. The chamfered portion that is shorter than the sipe length of the sipe is provided on each of the edge on the leading side and the edge on the trailing side of the sipe, and the non-chamfered regions in which other chamfered portions are not present are disposed at the portions facing the chamfered portions of the sipe. Thus, the drainage effect can be improved with the chamfered portions, and a water film can be effectively removed by the edge effect in the non-chamfered regions. As a result, the steering stability performance on wet road surfaces can be greatly improved. Moreover, the chamfered portion and the non-chamfered region are disposed alongside each other on the edge on the leading side and the edge on the trailing side in this manner. Thus, the effect of enhancing wet performance as described above when braking and driving can be maximally achieved.

In addition, at least one end of the sipe communicates with the main groove, the profile line defining the road contact surface of the rib including the sipe projects further to the outer side in the tire radial direction than the reference tread profile line in a meridian cross-sectional view, the radius of curvature TR of the arc forming the reference tread profile line and the radius of curvature RR of the arc forming the profile line of the rib satisfy the relationship of TR>RR, and only one of the chamfered portions on the leading side and the trailing side of the sipe is disposed so as to straddle the maximum projection position of the profile line of the rib. Therefore, in the rib including the sipe, drainage in the rib is promoted due to a shape projecting to the outer side in the tire radial direction, which leads to further improvement in steering stability performance on wet road surfaces. Furthermore, since the maximum projection amount D of the rib with respect to the reference tread profile line and the maximum width W of the chamfered portion disposed so as to straddle the maximum projection position satisfy the relationship of $0.05 \text{ mm}^2 < W \times D < 1.50 \text{ mm}^2$, it is possible to improve the steering stability performance on dry road surfaces and the steering stability performance on wet road surfaces in a well-balanced manner.

The shape of the rib promotes drainage in the rib and improves steering stability performance on wet road surfaces. In particular, since only one of the chamfered portions on the leading side and the trailing edge is disposed so as to straddle the maximum projection position of the rib, the rigidity of the rib can be ensured as compared with a case where both of the chamfered portions are disposed so as to straddle the maximum projection position of the rib. Due to this, the pneumatic tire according to an embodiment of the present technology is excellent in improving the steering stability performance on dry road surfaces and the steering stability performance on wet road surfaces in a compatible manner.

In the present technology, preferably, only one end of the sipe terminates in the rib. Due to this, the rigidity of the rib can be improved, and the steering stability performance on dry road surfaces can be improved effectively.

In the present technology, preferably, the sipe is inclined with respect to the tire circumferential direction. Due to this, the edge effect can be improved, and the steering stability performance on wet road surfaces can be improved effectively.

In the present technology, preferably, an inclination angle θ on an acute angle side of the sipe with respect to the tire circumferential direction is from 40° to 80°. Due to this, the steering stability performance on dry road surfaces and the steering stability performance on wet road surfaces can be improved in a compatible manner.

In the present technology, preferably, the sipe is disposed in the plurality of rows of ribs. Due to this, the steering stability performance on dry road surfaces and the steering stability performance on wet road surfaces can be improved in a compatible manner.

In the present technology, preferably, at least a portion of the sipe is curved or bent in a plan view. Due to this, the total amount of the edges in each sipe is increased, and the steering stability performance on wet road surfaces can be improved effectively.

DETAILED DESCRIPTION

Figure 1:
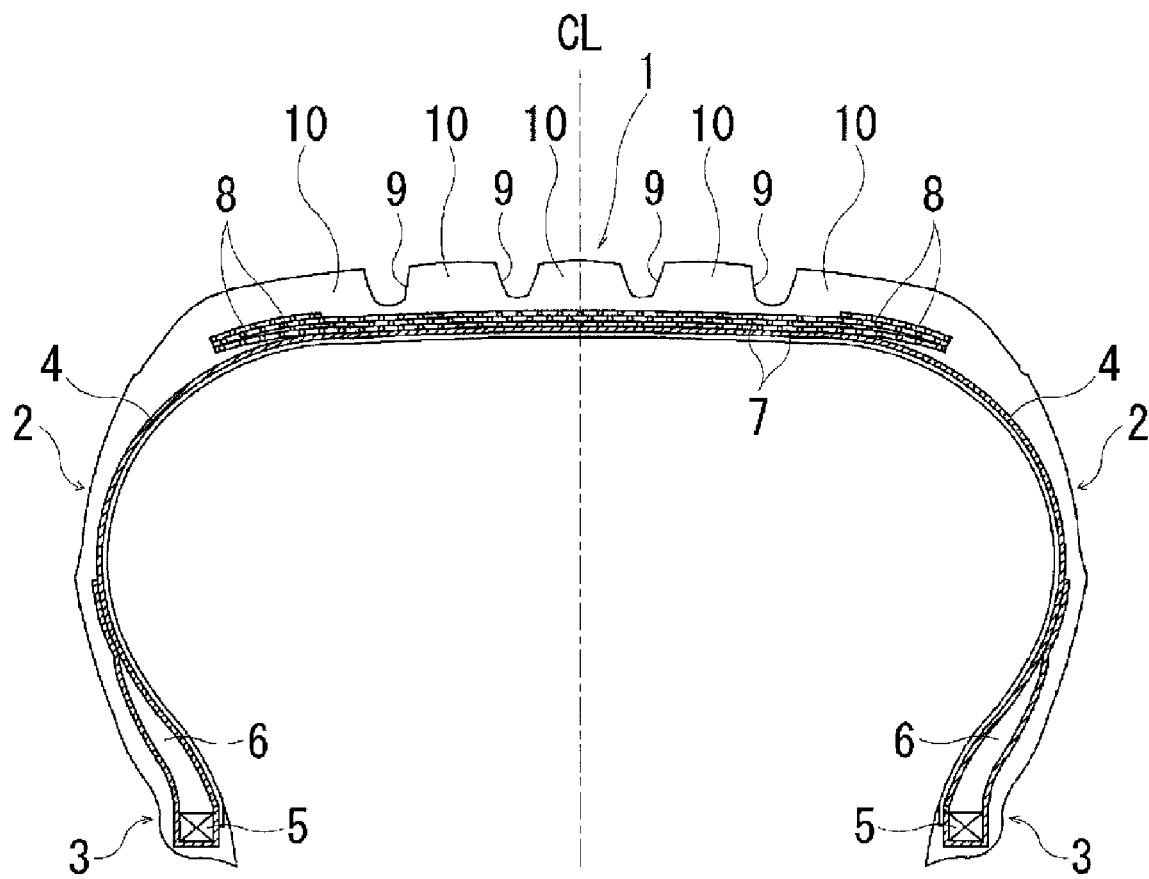
FIG. 1 is a meridian cross-sectional view illustrating a pneumatic tire according to an embodiment of the present technology.

Configurations of embodiments of the present technology will be described in detail below with reference to the accompanying drawings. FIG. 1 illustrates a pneumatic tire according to an embodiment of the present technology. In FIG. 1, CL denotes a tire center line.

As illustrated in FIG. 1, a pneumatic tire according to an embodiment of the present technology includes an annular tread portion 1 extending in the tire circumferential direction, a pair of sidewall portions 2, 2 respectively disposed on both sides of the tread portion 1, and a pair of bead portions 3, 3 each disposed on an inner side of the sidewall portions 2 in a tire radial direction.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5.

On the other hand, a plurality of belt layers 7 are embedded on the outer circumferential side of the carcass layer 4 in the tread portion 1. Each of the belt layers 7 includes a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to fall within a range of from 10° to 40°, for example. Steel cords are preferably used as the reinforcing cords of the belt layers 7. To improve high-speed durability, at least one belt cover layer 8, formed by disposing reinforcing cords at an angle of, for example, not greater than 5° with respect to the tire circumferential direction, is disposed on an outer circumferential side of the belt layers 7. Organic fiber cords such as nylon and aramid are preferably used as the reinforcing cords of the belt cover layer 8.

A plurality of main grooves 9 extending in the tire circumferential direction are formed in the tread portion 1. A plurality of ribs 10 are defined in the tread portion 1 by these main grooves 9. Note that in the present technology, the main groove 9 refers to a groove including a wear indicator.

Note that the tire internal structure described above represents a typical example for a pneumatic tire, but the pneumatic tire is not limited thereto.

Figure 2:
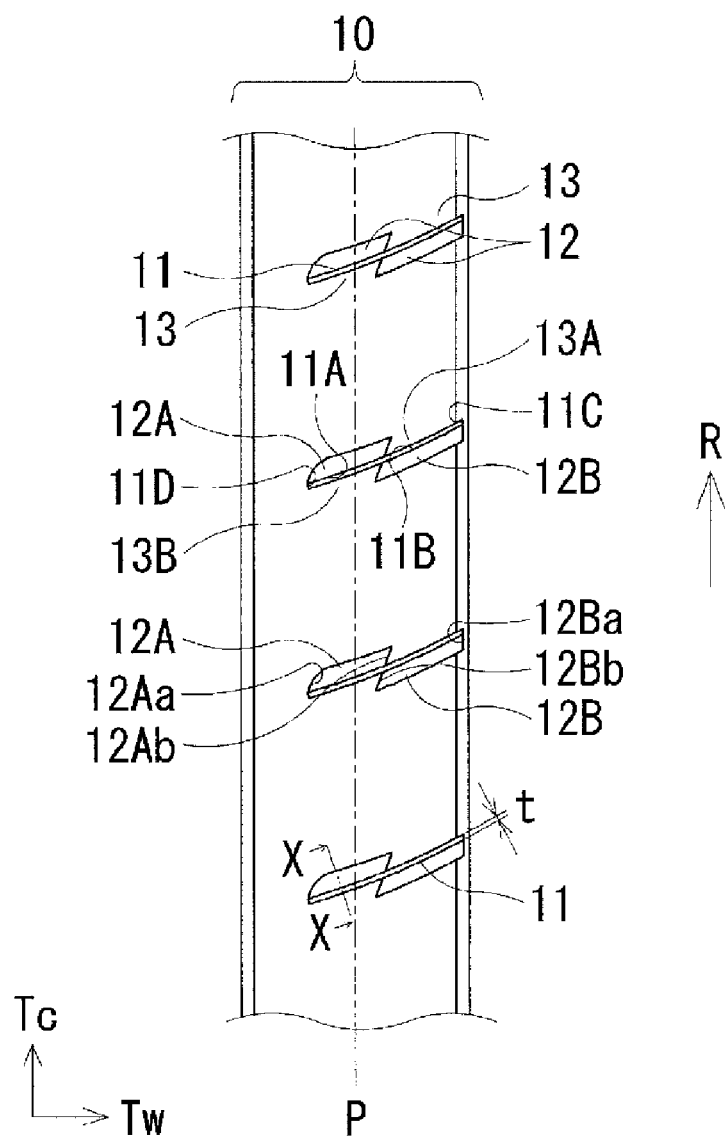
FIG. 2 is a plan view illustrating a portion of a tread portion of the pneumatic tire according to the embodiment of the present technology.

FIG. 2 illustrates a portion of a tread portion of a pneumatic tire according to an embodiment of the present technology. In FIG. 2, Tc denotes the tire circumferential direction, Tw denotes a tire width direction, and P denotes a maximum projection position of the rib 10 with respect to a reference tread profile line PL0 which will be described later.

As illustrated in FIG. 2, a plurality of sipes 11 extending in the tire width direction are formed in the rib 10. The sipes 11 have an overall shape that is curved and are formed in the rib 10 at intervals in the tire circumferential direction. Each sipe 11 has an edge 11A on the leading side with respect to a rotation direction R and an edge 11B on the trailing side with respect to the rotation direction R. The chamfered portions 12 are formed on the edge 11A on the leading side and the edge 11B on the trailing side, the edges 11A and 11B facing each other. Additionally, one end 11C in the tire width direction of the sipe 11 communicates with the main groove 9 located on one side of the rib 10, and the other end 11D in the tire width direction terminates in the rib 10. That is, the sipe 11 is a semi-closed sipe in which only the one end 11C communicates with the main groove 9. According to an embodiment of the present technology, the sipes 11 are narrow grooves having a groove width t of 1.5 mm or less.

The chamfered portions 12 include a chamfered portion 12A on the leading side with respect to the rotation direction R and a chamfered portion 12B on the trailing side with respect to the rotation direction R. At portions facing the chamfered portions 12, non-chamfered regions 13 in which other chamfered portions are not present are provided. More specifically, a non-chamfered region 13B on the trailing side with respect to the rotation direction R is provided in a portion facing the chamfered portion 12A, and a non-chamfered region 13A on the leading side with respect to the rotation direction R is provided in a portion facing the chamfered portion 12B. The chamfered portion 12 and the non-chamfered region 13 are formed adjacent to one another on the edge 11A on the leading side and the edge 11B on the trailing side of the sipe 11 in this manner, respectively.

Figure 3:
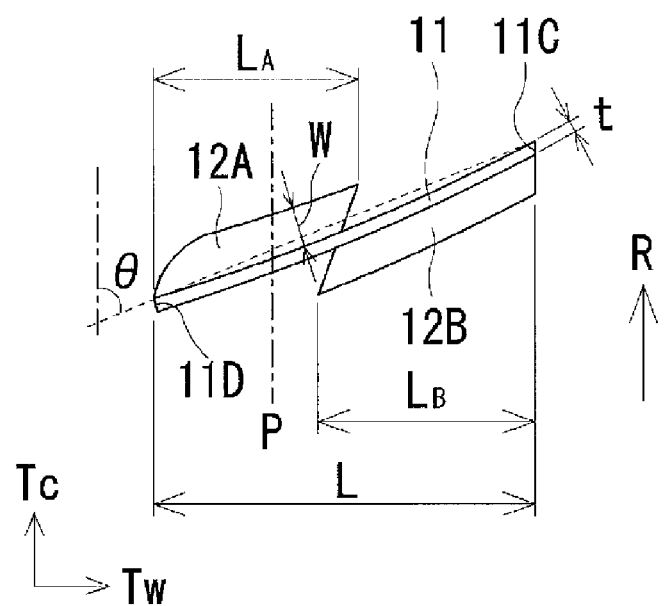
FIG. 3 is a plan view illustrating a sipe and a chamfered portion thereof formed in the rib of FIG. 2.

As illustrated in FIG. 3, the lengths of the sipe 11 and the chamfered portions 12A, 12B in the tire width direction are defined as a sipe length L and chamfer lengths $L_A$, $L_B$, respectively. The sipe length L and the chamfer lengths LA, LB are lengths in the tire width direction from one end of the sipe 11 and each of the chamfered portions 12A, 12B to the other end. The chamfer lengths $L_A$, $L_B$ of the chamfered portions 12A, 12B are shorter than the sipe length L of the sipe 11.

Figure 4:
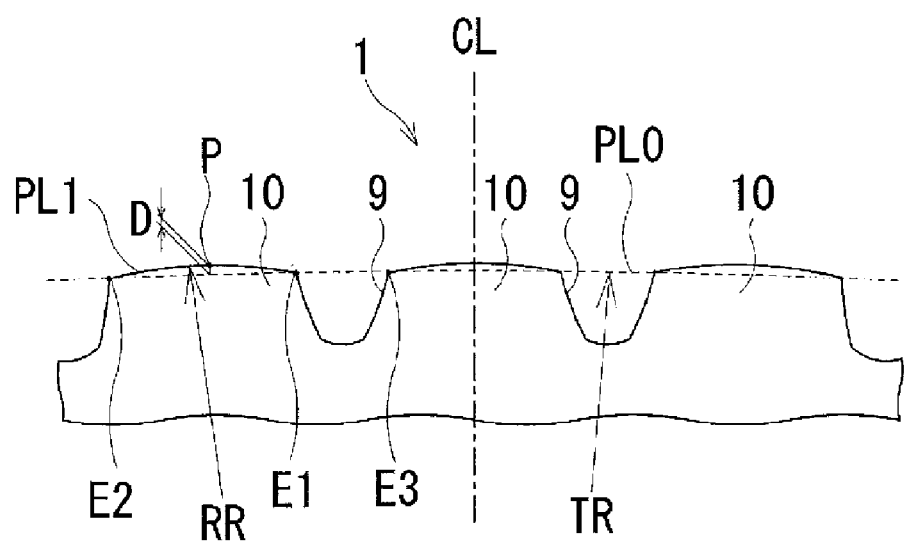
FIG. 4 is a meridian cross-sectional view illustrating a contour shape of the tread portion of the pneumatic tire according to the embodiment of the present technology.

FIG. 4 illustrates a contour shape of the tread portion 1 of the pneumatic tire according to the embodiment of the present technology. In FIG. 4, in a meridian cross-sectional view, when the reference tread profile line PL0 is assumed, the reference tread profile line PL0 formed from an arc (radius of curvature: TR) passing through three points (endpoints E1 to E3) including: both endpoints E1 and E2 in the tire width direction of the rib 10 including the sipe 11 and an endpoint E3 in the tire width direction of the main groove 9 located close to the tire center line CL among the main grooves 9 adjacent to the rib 10, a profile line PL1 formed from an arc (radius of curvature: RR) that defines a road contact surface of the rib 10 projects further to the outer side in the tire radial direction than the reference tread profile line PL0. The arc forming the reference tread profile line PL0 and the arc forming the profile line PL1 are arcs having the center on the inner side in the tire radial direction. The radius of curvature TR of the arc forming the reference tread profile line PL0 of the tread portion 1 and the radius of curvature RR of the arc forming the profile line PL1 of the rib 10 satisfy a relationship of TR>RR.

Note that FIG. 4 illustrates the contour shape of the tread portion 1 in an exaggerated manner in order to facilitate understanding of the characteristics of the tread portion 1, and the contour shape thereof does not necessarily match an actual contour shape. Additionally, when the edges of the rib 10 of the tread portion 1 are chamfered, the endpoints E1 and E2 of the rib 10 are identified by the intersection points of an extension line of the groove wall surface of the main groove 9 in the tire meridian cross-section and an extension line of the road contact surface of the rib 10. When the reference tread profile line PL0 is assumed in the rib 10 located on the tire center line CL, three points are used as a reference, the three points including: both endpoints in the tire width direction of the rib 10 and an endpoint of one of the main grooves 9 located on both sides of the rib 10 on the inner side in the tire width direction of the rib 10. When the reference tread profile line PL0 is assumed in the rib 10 located on the outermost side (the shoulder portion) in the tire width direction, three points are used as a reference, the three points including: an endpoint on the inner side in the tire width direction of the rib 10 and both endpoints in the tire width direction of another rib 10 located on the inner side in the tire width direction of the rib 10.

In the pneumatic tire described above, a position in the tire width direction where the projection amount of the profile line PL1 of the ribs 10 with respect to the reference tread profile line PL0 is greatest is a maximum projection position P. Any one of the chamfered portion 12A on the leading side and the chamfered portion 12B on the trailing side of the sipe 11 is disposed so as to straddle the maximum projection position P of the profile line PL1 of the rib 10. In other words, only one of the chamfered portions 12A and 12B is present on both sides in the tire width direction with respect to the maximum projection position P. In the embodiment illustrated in FIGS. 2 and 3, the chamfered portion 12A is disposed so as to straddle the maximum projection position P, and the chamfered portion 12B is disposed so as to be separated from the maximum projection position P in the tire width direction.

The maximum value of the projection amount of the profile line PL1 with respect to the reference tread profile line PL0 is a maximum projection amount D (mm), and the maximum value of the width of the chamfered portion 12 measured along the direction orthogonal to the sipe 11 is a maximum width W (mm). At this time, the maximum projection amount D of the rib 10 with respect to the reference tread profile line PL0 and the maximum width W of the chamfered portion 12 (the chamfered portion 12A in FIG. 2) so as to straddle the maximum projection position P satisfy a relationship of 0.05 mm$^2$<W×D<1.50 mm$^2$. In particular, a relationship of 0.10 mm$^2$<W×D<1.00 mm$^2$ is preferably satisfied. Additionally, the maximum projection amount D of the rib 10 with respect to the reference tread profile line PL0 is preferably in a range of from 0.1 mm to 0.8 mm, and the maximum width W of the chamfered portion 12 disposed so as to straddle the maximum projection position P is preferably in a range of from 0.5 mm to 4.0 mm.

In the pneumatic tire described above, the chamfered portion 12 that is shorter than the sipe length L of the sipe 11 is provided on each of the edge 11A on the leading side and the edge 11B on the trailing side of the sipe 11, and the non-chamfered regions 13 in which other chamfered portions are not present are disposed at the portions of the sipe 11 facing the chamfered portions 12. Thus, the drainage effect can be improved with the chamfered portions 12, and a water film can be effectively removed by the edge effect in the non-chamfered regions 13 in which the chamfered portion 12 is not provided. As a result, the steering stability performance on wet road surfaces can be greatly improved. Moreover, the chamfered portion 12 and the non-chamfered region 13 in which chamfered portions are not present are disposed alongside each other on the edge 11A on the leading side and the edge 11B on the trailing side in this manner. Thus, the effect of enhancing wet performance as described above when braking and driving can be maximally achieved.

In addition, at least one end 11C, 11D of the sipe 11 communicates with the main groove 9, the profile line PL1 defining the road contact surface of the rib 10 including the sipe 11 projects further to the outer side in the tire radial direction than the reference tread profile line PL0 in the meridian cross-sectional view, the radius of curvature TR of the arc forming the reference tread profile line PL0 and the radius of curvature RR of the arc forming the profile line PL1 of the rib 10 satisfy the relationship of TR>RR, and only one of the chamfered portions 12A, 12B on the leading side and the trailing side of the sipe 11 is disposed so as to straddle the maximum projection position P of the profile line PL1 of the rib 10. Therefore, in the rib 10 including the sipe 11, drainage in the rib 10 is promoted due to a shape projecting to the outer side in the tire radial direction, which leads to further improvement in steering stability performance on wet road surfaces. Furthermore, since the maximum projection amount D of the rib 10 with respect to the reference tread profile line PL0 and the maximum width W of one of the chamfered portion 12A, 12B disposed so as to straddle the maximum projection position P satisfy the relationship of 0.05 mm$^2$<W×D<1.50 mm$^2$, it is possible to improve the steering stability performance on dry road surfaces and the steering stability performance on wet road surfaces in a well-balanced manner. Here, if the product of the maximum projection amount D and the maximum width W is not greater than 0.05 mm$^2$, the steering stability performance on wet road surfaces tends to degrade. If the product of the maximum projection amount D and the maximum width W is not less than 1.50 mm$^2$, the steering stability performance on dry road surfaces tends to degrade.

In contrast, even when both of the chamfered portions 12A, 12B are disposed so as to straddle the maximum projection position P of the ribs 10, the shape of the ribs 10 projecting to the outer side in the tire radial direction promotes drainage in the rib 10 and improves steering stability performance on wet road surfaces. However, in this case, the rigidity of the rib 10 is reduced at the maximum projection position P of the rib 10. In the present technology, since only one of the chamfered portions 12A, 12B is disposed so as to straddle the maximum projection position P of the rib 10, the rigidity of the ribs 10 can be ensured as compared with the case described above, and it is possible to achieve both improved steering stability performance on dry road surfaces and improved steering stability performance on wet road surfaces in a compatible manner.

In FIG. 2, although only one end 11C of the sipe 11 communicates with the main groove 9, there is no particular limitation thereto, and both ends 11C, 11D of the sipe 11 may communicate with the main groove 9. If only one of the ends 11C, 11D of the sipe 11 terminates in the rib 10, the rigidity of the rib 10 can be improved as compared with a case where both ends 11C, 11D of the sipe 11 communicate with the main groove 9, and the steering stability performance on dry road surfaces can be improved effectively.

Additionally, the sipe 11 is inclined with respect to the tire circumferential direction. Since the sipe 11 is inclined with respect to the tire circumferential direction, the edge effect can be improved, and the steering stability performance on dry road surfaces can be improved effectively. Note that an inclination angle θ (see FIG. 3) is an inclination angle on an acute angle side of the sipe 11 with respect to the tire circumferential direction. When at least a portion of the sipe 11 is curved or bent in a plan view, the inclination angle θ is an angle with respect to the tire circumferential direction of a virtual line (dotted line illustrated in FIG. 3) that joins both ends 11C, 11D of the sipe 11. In this case, the inclination angle θ of the sipe 11 is preferably from 40° to 80° and more preferably from 50° to 70°. By appropriately setting the inclination angle θ of the sipe 11 in this manner, it is possible to improve the steering stability performance on dry road surfaces more effectively. Here, if the inclination angle θ is smaller than 40°, uneven wear resistance performance degrades. If the inclination angle θ exceeds 80°, the effect of improving the steering stability performance on wet road surfaces is not sufficiently obtained. Note that, when a so-called pitch variation is employed in the groove pattern of the tread portion 1, the plurality of sipes 11 are provided at non-uniform intervals in the tire circumferential direction, and the shapes and dimensions of the sipes 11 are different from each other, the inclination angle θ of the sipe 11 is the inclination angle of the sipe 11 at an intermediate pitch (for example, a pitch excluding the maximum pitch and the minimum pitch in the case of three types of pitch variations) in the rib 10.

Furthermore, among both ends 12Ba, 12Bb of the chamfered portion 12B in the tire width direction, the end 12Ba near the end 11C of the sipe 11 is in communication with the main groove 9 adjacent to the rib 10. Due to this, when one end 12Ba of the chamfered portion 12 communicates with the main groove 9, the steering stability performance on wet road surfaces can be improved effectively. Furthermore, although both ends 12Aa, 12Ab in the tire width direction of the chamfered portion 12A terminate in the rib 10, there is no particular limitation thereto, and the end 12Aa near the end 11D of the sipe 11 may be extended along the extension direction of the chamfered portion 12A so as to communicate with the main groove 9. In this case, since each of the chamfered portions 12A, 12B is in communication with the main groove 9 located on both sides of the rib 10, the steering stability performance on wet road surfaces can be greatly improved. On the other hand, each of the chamfered portions 12A, 12B may be terminated within the rib 10. Due to this, since the rigidity of the rib 10 can be improved, the steering stability performance on dry road surfaces can be improved effectively.

In the pneumatic tire described above, the sipe 11 is preferably disposed in a plurality of rows of ribs 10 among the ribs 10 formed in the tread portion 1. By providing the sipe 11 in the plurality of rows of ribs 10 in this manner, the steering stability performance on dry road surfaces and the steering stability performance on wet road surfaces can be improved in a compatible manner. In particular, the sipe 11 is preferably disposed in the rib 10 located on the tire center line CL in the tread portion 1 and/or other ribs 10 located on both sides of the rib 10. By disposing the sipe 11 in the rib 10 located closer to the central portion in the tire width direction than the rib 10 located on the outermost side (the shoulder portion) in the tire width direction, the effect obtained by the sipe 11 including the chamfered portion 12 is remarkable.

Additionally, at least a portion of the sipe 11 is preferably curved or bent in a plan view. The overall shape of the sipe 11 may be arcuate. Since the sipe 11 has a curved or bent shape rather than a linear shape in a plan view in this manner, the total amount of the edges 11A and 11B on the leading side and the trailing side of the sipe 11 is increased, and the steering stability performance on wet road surfaces can be improved effectively.

The maximum width W of the chamfered portion 12 is preferably from 0.8 times to 5.0 times the groove width t of the sipe 11 and more preferably from 1.2 times to 3.0 times. By appropriately setting the maximum width W of the chamfered portion 12 with respect to the groove width t of the sipe 11 in this manner, the steering stability performance on dry road surfaces and the steering stability performance on wet road surfaces can be improved in a compatible manner. When the maximum width W of the chamfered portion 12 is less than 0.8 times the groove width t of the sipe 11, the steering stability performance on wet road surfaces cannot be sufficiently improved, and when the maximum width W is greater than 5.0 times the groove width t, the steering stability performance on dry road surfaces cannot be sufficiently improved.

Figure 5:
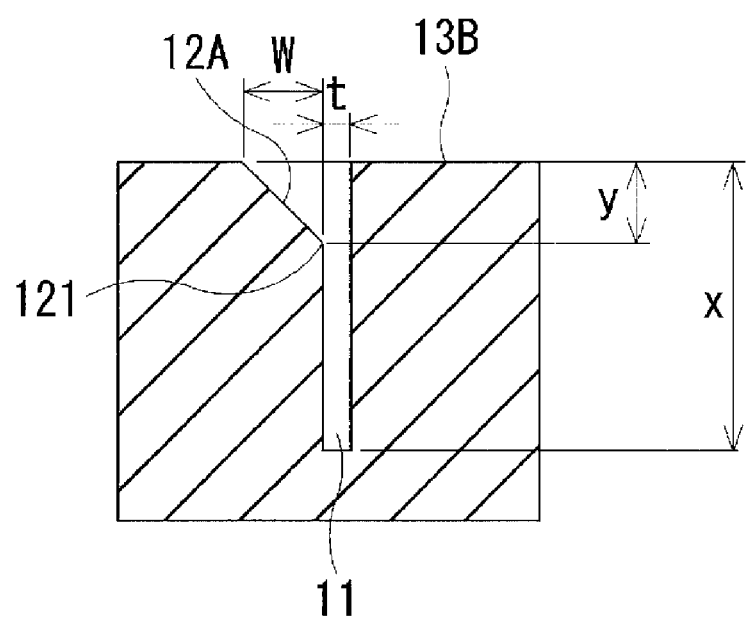
FIG. 5 is a cross-sectional view taken along the line X-X in FIG. 2.

FIG. 5 is a cross-sectional view orthogonal to the sipe 11 with the tread portion 1 cut away in the vertical direction. As illustrated in FIG. 5, when the maximum depth of the sipe 11 is x (mm) and the maximum depth of the chamfered portion 12 is y (mm), the sipe 11 and the chamfered portion 12 are formed so that the maximum depth y (mm) is less than the maximum depth x (mm). The maximum depth x of the sipe 11 is preferably from 3 mm to 8 mm. The groove width t of the sipe 11 is substantially constant in a range from an end 121 located on the inner side of the chamfered portion 12 in the tire radial direction to the groove bottom of the sipe 11. In a configuration in which a protrusion is disposed on the groove wall of the sipe 11, for example, the groove width t of the sipe 11 does not include the height of the protrusion. Also, in a configuration in which the groove width of the sipe 11 gradually narrows toward the groove bottom, the groove width of the sipe 11 is substantially measured as the groove width not including the narrow portion.

In the pneumatic tire described above, the maximum depth x (mm) and the maximum depth y (mm) preferably satisfy the relationship of Formula (1) below and more preferably satisfy a relationship of y≤x×0.3+0.5. By providing the sipes 11 and the chamfered portions 12 so as to satisfy the above-mentioned relationship, the chamfered area can be minimized as compared with a known chamfered sipe, and steering stability performance on dry road surfaces can be improved. As a result, the steering stability performance on dry road surfaces and the steering stability performance on wet road surfaces can be improved in a compatible manner. Here, when y<x×0.1 is true, the drainage effect from the chamfered portions 12 is insufficient, and when y>x×0.3+1.0 is true, the rigidity of the rib 10 is reduced, leading to a reduction in the steering stability performance on dry road surfaces.

$$x \times 0.1 \leq y \leq x \times 0.3 + 1.0 \quad (1)$$

Figure 6A:
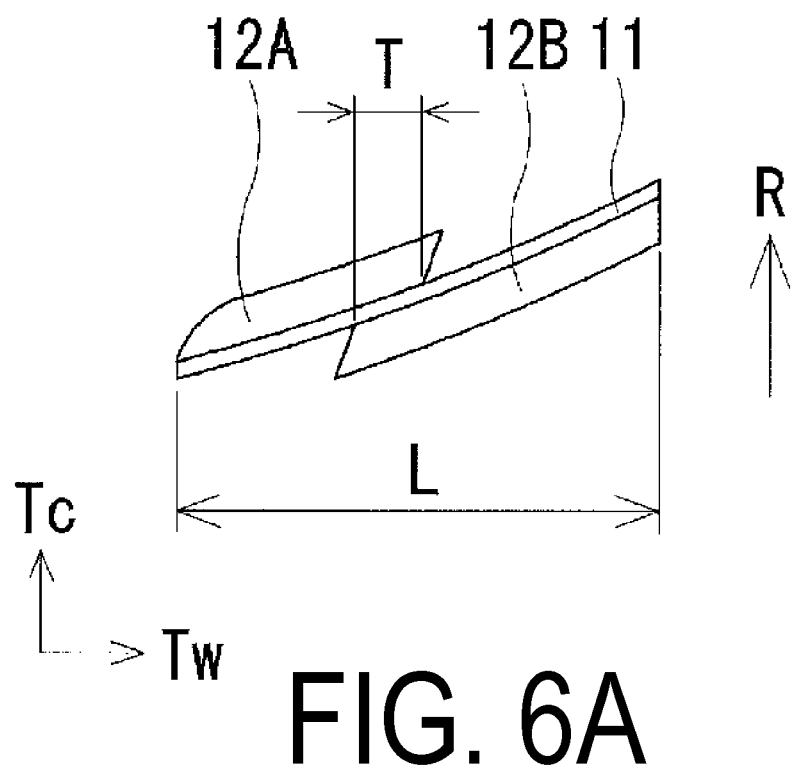
FIGS. 6A and 6B are plan views illustrating modified examples of a sipe and chamfered portions thereof of a pneumatic tire according to an embodiment of the present technology, respectively.
Figure 6B:
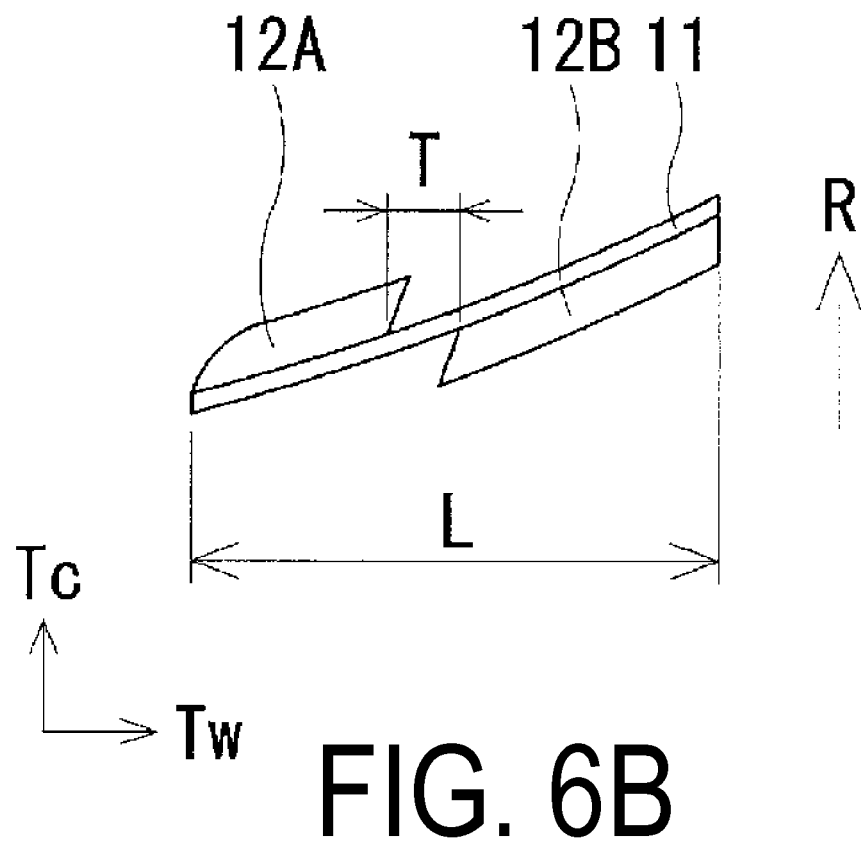

FIGS. 6A and 6B illustrate modified examples of a sipe and chamfered portions thereof of the pneumatic tire according to the embodiment of the present technology. As illustrated in FIG. 6A, the chamfered portions 12A, 12B are formed so as to overlap partially in a central portion in the tire width direction of the sipe 11. Here, the length in the tire width direction of the overlapping portion, which is a portion where the chamfered portion 12A and the chamfered portion 12B overlap, is defined as an overlap length T. On the other hand, as illustrated in FIG. 6B, when the chamfered portion 12A and the chamfered portion 12B do not partially overlap and are separated by a certain interval, the percentage of the overlap length T with respect to the sipe length L is expressed as a negative value. The overlap length T of the overlapping portion is preferably from −30% to 30% of the sipe length L and more preferably from −15% to 15%. By appropriately setting the overlap length T of the chamfered portion 12A, 12B with respect to the sipe length L in this manner, the steering stability performance on dry road surfaces and the steering stability performance on wet road surfaces can be improved in a compatible manner. Here, when the overlap length T is greater than 30%, the steering stability performance on dry road surfaces is not sufficiently improved, and when the overlap length T is less than −30%, the steering stability performance on wet road surfaces is not sufficiently improved.

EXAMPLES

Tires of Conventional Examples 1 and 2, Comparative Examples 1 and 2, and Examples 1 to 6 are manufactured, in which the pneumatic tire has a tire size of 245/40R19 and includes, in a tread portion, a plurality of main grooves extending in the tire circumferential direction, a plurality of rows of ribs defined by the main grooves, and a sipe extending in the tire width direction, the sipe has at least one end communicating with the main groove and a chamfered portion in at least one edge, and the position of the chamfered portion, the arrangement position of the chamfered portion (both sides or one side), a magnitude relationship between the sipe length L and the chamfer length $L_A$, $L_B$, the presence/absence of chamfer at a portion facing the chamfered portion, a magnitude relationship between the radius of curvature TR and the radius of curvature RR, the product of the maximum projection amount D and the maximum width W, the presence/absence of termination of one end of the sipe in the rib, the inclination angle θ of the sipe with respect to the tire circumferential direction, the number of rows of ribs with sipes, and the overall shape of the sipe (straight line or curved) are set as illustrated in Table 1.

Note that, in Table 1, when the position of a chamfered portion is "not straddle", it means that the chamfered portion is disposed so as to be separated from the maximum projection position of the profile line of the rib in the tire width direction, whereas when the position of a chamfered portion is "straddle", it means that only one of the chamfered portions on the leading side and the trailing side is present on both sides in the tire width direction with respect to the maximum projection position of the profile line of the rib. In the tires of Conventional Examples 1 and 2, Comparative Examples 1 and 2, and Examples 1 to 6, the profile line defining the road contact surface of the rib with the sipe projects further to the outer side in the tire radial direction than the reference tread profile line, and the maximum projection position of the profile line of the rib is located at the central portion in the tire width direction of the rib.

A sensory evaluation regarding the steering stability performance on dry road surfaces and the steering stability performance on wet road surfaces is performed with respect to these test tires by a test driver, and the results are illustrated in Table 1.

The sensory evaluation for the steering stability performance on dry road surfaces and the steering stability performance on wet road surfaces is performed with the test tires on a wheel with a rim size of 19×8.5 J mounted on a vehicle and inflated to an air pressure of 260 kPa. Evaluation results are expressed as index values, with the results of Conventional Example 1 being assigned as an index value of 100. Larger index values indicate superior steering stability performance on dry road surfaces and superior steering stability performance on wet road surfaces.

TABLE 1

|  | Conventional Example 1 | Conventional Example 2 | Comparative Example 1 | Comparative Example 2 |
|---|---|---|---|---|
| Position of chamfered portion | Not straddle | Not straddle | Straddle | Straddle |
| Arrangement position of chamfered portion (both sides or one side) | Both sides | One side | Both sides | Both sides |
| Size relationship between sipe length L and chamfer lengths $L_A$, $L_B$ | $L = L_A, L_B$ | $L = L_A$ | $L > L_A, L_B$ | $L > L_A, L_B$ |
| Chamfer provided at portion facing chamfered portion | Yes | No | No | No |
| Magnitude relationship between radius of curvature TR and radius of curvature RR | TR > RR | TR > RR | TR > RR | TR > RR |
| Product (mm²) of maximum projection amount D and maximum width W | 0.90 | 0.90 | 0.05 | 1.50 |

TABLE 1-continued

|  |  |  |  |  |
|---|---|---|---|---|
| Presence/absence of termination in rib of one end of sipe | Yes | Yes | No | No |
| Inclination angle θ of sipe with respect to tire circumferential direction | 90° | 90° | 90° | 90° |
| Number of rows of ribs including sipes | 1 row | 1 row | 1 row | 1 row |
| Overall shape of sipe (straight line or curved) | Straight lines | Straight lines | Straight lines | Straight lines |
| Steering stability performance on dry road surfaces | 100 | 102 | 100 | 97 |
| Steering stability performance on wet road surfaces | 100 | 100 | 99 | 100 |

|  | Example 1 | Example 2 | Example 3 | Example 4 | Example 5 | Example 6 |
|---|---|---|---|---|---|---|
| Position of chamfered portion | Straddle | Straddle | Straddle | Straddle | Straddle | Straddle |
| Arrangement position of chamfered portion (both sides or one side) | Both sides | Both sides | Both sides | Both sides | Both sides | Both sides |
| Size relationship between sipe length L and chamfer lengths $L_A$, $L_B$ | $L > L_A, L_B$ | $L > L_A, L_B$ | $L > L_A, L_B$ | $L > L_A, L_B$ | $L > L_A, L_B$ | $L > L_A, L_B$ |
| Chamfer provided at portion facing chamfered portion | No | No | No | No | No | No |
| Magnitude relationship between radius of curvature TR and radius of curvature RR | TR > RR | TR > RR | TR > RR | TR > RR | TR > RR | TR > RR |
| Product ($mm^2$) of maximum projection amount D and maximum width W | 0.90 | 0.90 | 0.90 | 0.90 | 0.90 | 0.90 |
| Presence/absence of termination in rib of one end of sipe | No | Yes | Yes | Yes | Yes | Yes |
| Inclination angle θ of sipe with respect to tire circumferential direction | 90° | 90° | 85° | 65° | 65° | 65° |
| Number of rows of ribs including sipes | 1 row | 1 row | 1 row | 1 row | 3 rows | 3 rows |
| Overall shape of sipe (straight line or curved) | Straight lines | Straight lines | Straight lines | Straight lines | Straight lines | Curved |
| Steering stability performance on dry road surfaces | 105 | 107 | 108 | 109 | 112 | 113 |
| Steering stability performance on wet road surfaces | 105 | 105 | 107 | 109 | 112 | 114 |

As can be seen from Table 1, by devising the shape of the chamfered portions formed on the sipes, the tires of Examples 1 to 6 have improved the steering stability performance on dry road surfaces and the steering stability performance on wet road surfaces in a compatible manner.

On the other hand, in the tire of Comparative Example 1, since the product of the maximum projection amount D and the maximum width W is set to be lower than the range stipulated in the present technology, the effect of improving the steering stability performance on wet road surfaces is not sufficiently obtained. In the tire of Comparative Example 2, since the product of the maximum projection amount D and the maximum width W is set to be higher than the range stipulated in the present technology, the effect of improving the steering stability performance on dry road surfaces is not sufficiently obtained.

The invention claimed is:

1. A pneumatic tire, comprising:
in a tread portion,
a plurality of main grooves extending in a tire circumferential direction;
a plurality of rows of ribs defined by the plurality of main grooves; and
sipes extending in a tire width direction and disposed in at least two ribs of the plurality of rows of ribs,
the sipes comprising at least one end communicating with one of the main grooves and an edge on a leading side and an edge on a trailing side, the edges facing each other, all of the sipes in a same rib communicating with a same one of the main grooves,
a chamfered portion shorter than a sipe length of the sipes being formed in each of the edge on the leading side and the edge on the trailing side,
a non-chamfered region where other chamfered portions are not present being provided in a portion of the sipes facing each of the chamfered portions,
a profile line defining a road contact surface of the ribs comprising the sipes projecting further to an outer side in a tire radial direction than a reference tread profile line in a meridian cross-sectional view,
a radius of curvature TR (mm) of an arc forming the reference tread profile line and a radius of curvature RR (mm) of an arc forming the profile line of the ribs satisfying a relationship of TR>RR,
only one of the chamfered portions on the leading side or the trailing side of the sipes being disposed straddling a maximum projection position of the profile line of the ribs,
a maximum projection amount D (mm) of the ribs with respect to the reference tread profile line and a maximum width W (mm) of the chamfered portion disposed straddling the maximum projection position satisfying a relationship of 0.05 mm$^2$<W×D<1.50 mm$^2$,
a sipe depth x and a chamfer depth y satisfying a relationship of x×0.55≤y≤x×0.3+1.0,
the plurality of rows of ribs including a pair of intermediate ribs each disposed to not overlap a tire equatorial plane in the tire width direction, the intermediate ribs being positioned between the tire equatorial plane and outermost main grooves of the plurality of main grooves on either side from the tire equatorial plane, and
each intermediate rib of the pair of intermediate ribs having the sipes communicating with only one of the main grooves defining the intermediate ribs and terminating within the each intermediate rib.

2. A pneumatic tire, comprising:
in a tread portion,
a plurality of main grooves extending in a tire circumferential direction;
a plurality of rows of ribs defined by the plurality of main grooves; and
sipes extending in a tire width direction and disposed in at least two ribs of the plurality of rows of ribs,
the sipes comprising at least one end communicating with one of the main grooves and an edge on a leading side and an edge on a trailing side, the edges facing each other, all of the sipes in a same rib communicating with a same one of the main grooves,
a chamfered portion shorter than a sipe length of the sipes being formed in each of the edge on the leading side and the edge on the trailing side,
a non-chamfered region where other chamfered portions are not present being provided in a portion of the sipes facing each of the chamfered portions,
a profile line defining a road contact surface of the ribs comprising the sipes projecting further to an outer side in a tire radial direction than a reference tread profile line in a meridian cross-sectional view,
a radius of curvature TR (mm) of an arc forming the reference tread profile line and a radius of curvature RR (mm) of an arc forming the profile line of the ribs satisfying a relationship of TR>RR,
only one of the chamfered portions on the leading side or the trailing side of the sipes being disposed straddling a maximum projection position of the profile line of the ribs,
a maximum projection amount D (mm) of the ribs with respect to the reference tread profile line and a maximum width W (mm) of the chamfered portion disposed straddling the maximum projection position satisfying a relationship of 0.05 mm$^2$<W×D<1.50 mm$^2$,
a sipe depth x and a chamfer depth y satisfying a relationship of x×0.1≤y≤x×0.2,
the plurality of rows of ribs including a pair of intermediate ribs each disposed to not overlap a tire equatorial plane in the tire width direction, the intermediate ribs being positioned between the tire equatorial plane and outermost main grooves of the plurality of main grooves on either side from the tire equatorial plane, and
each intermediate rib of the pair of intermediate ribs having the sipes communicating with only one of the main grooves defining the intermediate ribs and terminating within the each intermediate rib.

3. The pneumatic tire according to claim 2, wherein the sipes are inclined with respect to the tire circumferential direction.

4. The pneumatic tire according to claim 2, wherein an inclination angle θ on an acute angle side of the sipes with respect to the tire circumferential direction is from 40° to 80°.

5. The pneumatic tire according to claim 2, wherein at least a portion of the sipes are curved or bent in a plan view.

6. The pneumatic tire according to claim 2, wherein the plurality of rows of ribs includes at least three ribs.

7. The pneumatic tire according to claim 2, wherein only one end of the sipes terminates in the ribs.

8. The pneumatic tire according to claim 7, wherein the sipes are inclined with respect to the tire circumferential direction.

9. The pneumatic tire according to claim 8, wherein an inclination angle θ on an acute angle side of the sipes with respect to the tire circumferential direction is from 40° to 80°.

10. The pneumatic tire according to claim 9, wherein at least a portion of the sipes are curved or bent in a plan view.

* * * * *